United States Patent
Deshpande et al.

(10) Patent No.: US 10,832,205 B2
(45) Date of Patent: Nov. 10, 2020

(54) SYSTEM AND METHOD FOR DETERMINING NODE ORDER FULFILLMENT PERFORMANCE

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Ali Koc, White Plains, NY (US); Yingjie Li, Chappaqua, NY (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 15/087,609

(22) Filed: Mar. 31, 2016

(65) Prior Publication Data

US 2017/0206478 A1    Jul. 20, 2017

Related U.S. Application Data

(60) Provisional application No. 62/279,738, filed on Jan. 16, 2016.

(51) Int. Cl.
*G06Q 10/08* (2012.01)
*G06Q 30/02* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC .......... G06Q 10/06315; G06Q 10/083; G06Q 10/0833; G06Q 10/0834; G06Q 10/087;
(Continued)

(56) References Cited

U.S. PATENT DOCUMENTS 7,295,990 B1 * 11/2007 Braumoeller ........ G06Q 10/063
705/7.31
7,370,005 B1   5/2008 Ham et al.
(Continued)

OTHER PUBLICATIONS

Felix T.S. Chan et al., Optimization of order fulfillment in distribution network problems. J Intell Manuf (2006) 17:307-319.*
(Continued)

*Primary Examiner* — Timothy Padot
(74) *Attorney, Agent, or Firm* — Scully, Scott, Murphy & Presser, PC; Joseph Petrokaitis, Esq.

(57) ABSTRACT

A method and system determining node order fulfillment performance considering cancelation costs. The method includes receiving a current order for fulfillment node assignment and calculating a cancelation ratio of a node of a plurality of nodes by dividing orders canceled due to back order from the node by orders scheduled from the node collected from a pre-assigned time period. The method also includes determining a cancelation cost of the node based on the cancelation ratio of said node. The method then includes automatically generating a node order assignment based on the determined cancelation cost for fulfillment of a current order.

12 Claims, 5 Drawing Sheets

(51) Int. Cl.

| | |
|---|---|
| *G06N 20/00* | (2019.01) |
| *G06F 16/14* | (2019.01) |
| *G06F 16/182* | (2019.01) |
| *G06F 16/17* | (2019.01) |
| *G06F 16/23* | (2019.01) |
| *G06N 5/00* | (2006.01) |
| *G06F 3/0482* | (2013.01) |
| *G06F 3/0484* | (2013.01) |
| *G06Q 30/06* | (2012.01) |
| *H04L 12/26* | (2006.01) |
| *G06N 5/04* | (2006.01) |
| *G06Q 10/06* | (2012.01) |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
CPC .......... G06Q 10/0875; G06Q 30/0201; G06Q 30/0206; G06Q 10/08345; G06Q 30/0284; G06Q 30/0635; G06Q 10/0633; G06Q 10/06375; G06Q 10/0838; G06Q 30/0283; G06F 16/1844; G06F 16/183; G06F 16/148; G06F 16/2365; G06F 16/1734; G06F 3/0482; G06F 3/04847; G06N 20/00; G06N 5/003; G06N 5/04; G06N 5/045; H04L 43/0882; H04L 43/16; H04L 43/0876
USPC ...................................................... 705/7.27
See application file for complete search history.

(56) References Cited

U.S. PATENT DOCUMENTS

| | | | |
|---|---|---|---|
| 7,917,387 B2 | 3/2011 | Spurr et al. | |
| 8,015,081 B1 | 9/2011 | Franco | |
| 8,249,917 B1 | 8/2012 | Kassmann et al. | |
| 8,352,382 B1 | 1/2013 | Katta et al. | |
| 8,374,922 B1* | 2/2013 | Antony | G06Q 30/00 705/26.1 |
| 8,407,110 B1* | 3/2013 | Joseph | G06Q 10/087 705/26.1 |
| 8,498,888 B1* | 7/2013 | Raff | G06Q 10/087 705/22 |
| 8,626,333 B2 | 1/2014 | Waddington et al. | |
| 8,655,742 B2* | 2/2014 | Cheng | G06Q 10/06 705/26.2 |
| 8,700,443 B1* | 4/2014 | Murray | G06Q 10/087 705/7.31 |
| 8,818,836 B1* | 8/2014 | Braumoeller | G06Q 10/063 705/7.25 |
| 2008/0040168 A1* | 2/2008 | Magner | G06Q 10/06398 705/7.37 |
| 2011/0258079 A1* | 10/2011 | Ngan | G06Q 20/12 705/26.44 |
| 2012/0072431 A1* | 3/2012 | Berlener | G06Q 10/087 707/748 |
| 2012/0150583 A1 | 6/2012 | Dueck et al. | |
| 2012/0150692 A1 | 6/2012 | Dueck et al. | |
| 2016/0110735 A1* | 4/2016 | Brereton | G06Q 30/0202 705/7.31 |
| 2017/0091683 A1* | 3/2017 | Tare | G06Q 10/06312 |
| 2017/0124631 A1* | 5/2017 | Bhandari | G06Q 30/0633 |

OTHER PUBLICATIONS

Yin-Yann Chen. The order fulfillment planning problem considering multi-site order allocation and single-site shop floor scheduling. J Intell Manuf (2014) 25:441-458.*

Shahparvari, S., et al. "Designing an Integrated Multi-objective Supply Chain Network Considering Volume Flexibility", Proceedings of the World Congress on Engineering and Computer Science, Oct. 2013, pp. 1-6, vol. II, International Association of Engineers, San Francisco, USA.

Kewill Corporation, "Omni-channel Optimization for Retailers: Fulfillment best practice to deliver on customer promises and drive down returns", Jul. 2013, pp. 1-12.

Xu, P. J., "Order Fulfillment in Online Retailing: What Goes Where", Sep. 2005, pp. 1-146, MIT Thesis.

Acimovic, J. A., "Lowering Outbound Shipping Costs in an Online Retail Environment by Making Better Fulfillment and Replenishment Decisions", Aug. 2012, pp. 1-198, MIT PhD thesis.

Acimovic, J. A., et al., "Making Better Fulfillment Decisions on the Fly in an Online Retail Environment", Manufacturing & Service Operations Management, Sep. 20, 2014, pp. 1-35, vol. 17, INFORMS.

Mell, P., et al., "The NIST Definition of Cloud Computing", NIST Special Publication 800-145, National Institute of Standards and Technology, U.S. Department of Commerce, Sep. 2011, pp. 1-7.

IBM Corporation, "IBM Sterling Order Management", Aug. 15, 2014, pp. 1-5.

* cited by examiner

FIG. 6

SYSTEM AND METHOD FOR DETERMINING NODE ORDER FULFILLMENT PERFORMANCE

CROSS REFERENCE TO RELATED PATENTS AND APPLICATIONS

This application claims priority from U.S. Provisional Application No. 62/279,738 filed on Jan. 16, 2016, which is incorporated by reference herein in its entirety.

BACKGROUND

This disclosure is directed to computer generated node order fulfillment performance and more particularly, to computer generated node order fulfillment performance considering cancelation costs.

Omni-channel retailers employ a number of channels to fulfill online orders. One approach to find optimal fulfillment solutions is to model the fulfillment problem as a multi-objective optimization problem, where the solution is the order item assignments across a large number of fulfillment candidate nodes (stores, ecommerce fulfillment centers, etc.).

After an order is assigned/scheduled to a node to fulfill, the order can be canceled from backlog due to various reasons, such as out of stock, limited node capacity, etc. By which time, a certain labor cost has already incurred on the node to try to fulfill the order. In addition, without the visibility of existing cancelation status for each node, the order fulfillment solution can keep assigning the future order to the same node with a high cancelation ratio, which leads to higher labor cost, longer delay, higher shipping/handling cost, and lower customer satisfaction.

SUMMARY OF THE INVENTION

One embodiment is directed to a method for determining node cancelation cost as a measure of order fulfillment performance. The method includes receiving a current order for fulfillment node assignment and calculating a cancelation ratio of a node of a plurality of nodes by dividing past orders canceled due to back order from the node by past orders scheduled from the node collected from a pre-assigned time period. The method also includes determining a cancelation cost of the node based on the cancelation ratio of said node. The method then includes automatically generating a node order assignment based on the determined cancelation cost for fulfillment of a current order.

In one embodiment, the cancelation cost of the node is calculated from multiplying the cancelation ratio of the node, an average hour spent in processing an order at the node and an hourly rate of labor cost at the node.

In one embodiment, the system further minimizes a fulfillment cost of a current order, wherein the fulfillment cost comprises a plurality of costs incurred by fulfilling the current order. In another embodiment, the fulfillment cost of the order comprising cancelation costs of one or more nodes selected from the plurality of nodes, shipping costs from the selected nodes and fulfillment capacity utilization costs of the selected nodes. In one embodiment, the system further comprises applying customer business objective weighting to minimize the fulfillment cost of a current order. In another embodiment, the system further identifies one or more nodes from the plurality of nodes with a lowest fulfillment cost and generates the node order assignment to the one or more nodes with the lowest fulfillment cost.

One embodiment is directed to a cancelation cost computation engine. The cost computation engine includes one or more non-transitory computer readable storage media and program instructions, stored on the one or more non-transitory computer-readable storage media, which when implemented by a user interface accessing a service provider website, cause the computer system to perform the step of calculating a cancelation ratio of each node of a plurality of nodes by dividing orders canceled due to back order from each respective node by orders scheduled from the respective node collected from a pre-assigned time period. The method also includes determining a cancelation cost of each node based on the cancelation ratio of said node. The method then includes automatically generating a node order assignment based on the determined cancelation cost for fulfillment of a current order.

One embodiment is directed to a non-transitory article of manufacture tangibly embodying computer readable instructions, which when implemented by a user interface accessing a service provider website, cause the computer system to perform the step of calculating a cancelation ratio of each node of a plurality of nodes by dividing orders canceled due to back order from each respective node by orders scheduled from the respective node collected from a pre-assigned time period. The method also includes determining a cancelation cost of each node based on the cancelation ratio of said node. The method then includes automatically generating a node order assignment based on the determined cancelation cost for fulfillment of a current order.

BRIEF DESCRIPTION OF THE DRAWINGS

These are other objects, features and advantages of the present invention will become apparent from the following detailed description, which is to be read in connection with the accompanying drawing, in which.

DETAILED DESCRIPTION

One embodiment of this disclosure is a system and method for determining node cancelation cost as a measure of order fulfillment performance. The cancelation cost is based on a cancelation ratio, which is the orders canceled due to back order divided by the orders scheduled. The cancelation cost is modeled in such a way that in general, the node with lower cancelation cost is preferred. In another embodiment, the cost can be factored in and dynamically adjusted in a multi-objective optimization-based fulfillment engine for balancing various objectives defined by the business needs.

By monetizing the rate of order cancelation as a cost to be considered for optimizing ongoing order sourcing, the system can reduce the possibility of overloading the node with high cancelation. As a result, the system can reduce the labor cost wasted on trying to fulfill the order yet to be canceled, reduce the potential delay, avoid the potential extra shipping cost incurred when trying to fulfill the order on time, thereby reducing the potential risk of harming customer satisfaction.

Figure 1:
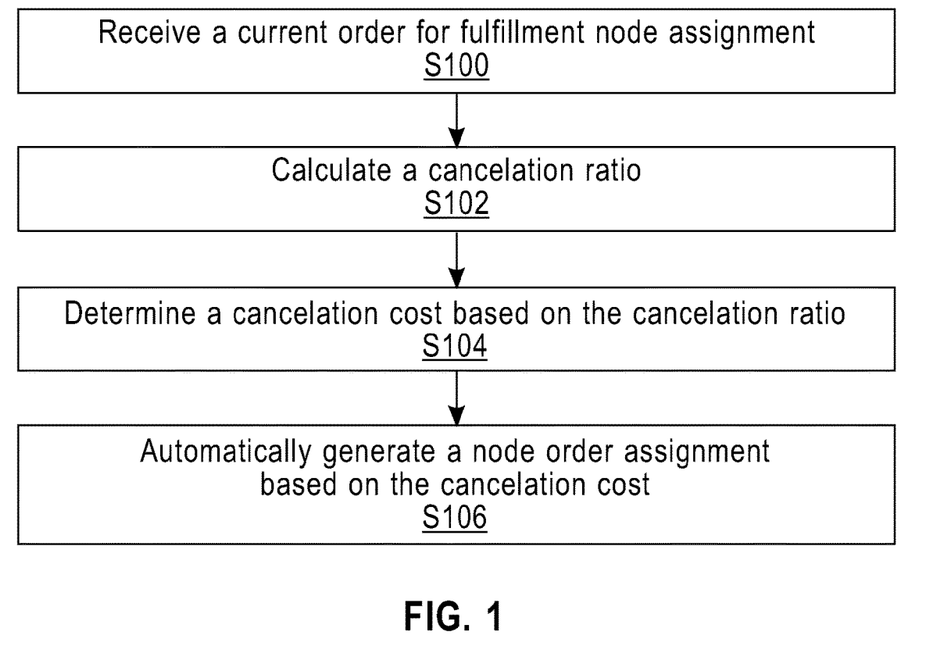
FIG. 1 is a flow chart of the steps of one embodiment of the method of the invention.

As is shown in FIG. 1, one embodiment of the method of the invention begins with step S100 of receiving a current order for fulfillment node assignment. At step S102, the system calculates a cancelation ratio of a node of a plurality of nodes by dividing past orders canceled due to back order from the node by past orders scheduled from the node collected from a pre-assigned time period. The pre-assigned time period for collecting retail data may be any suitable period based on the type of business, such as daily, weekly, etc. In addition, the time period can be adjusted based on other factors such as peak time of a season or non-peak time of a season, etc. Orders canceled due to back order from the node and orders scheduled from the node are retail data updated periodically based on historical data of the node including order line scheduled and order release status.

At step S104, the system determines a cancelation cost of the node based on the cancelation ratio of said node calculated in step S102.

Further at step S106, the system automatically generates a node order assignment based on the cancelation cost determined in step S104 for fulfillment of a current order.

In one embodiment, the cancelation cost of the node is calculated from multiplying the cancelation ratio of the node, an average hour spent in processing an order at the node and an hourly rate of labor cost at the node. By defining Hn as the average hour spent in processing and order at node n, Ln as the hourly rate of labor cost at node n, CRn as the cancelation ratio at node n, then the cancelation cost CCn of node n is calculated as CCn=CRn×Ln×Hn. The cancelation ratio of the node is calculated in step S102. The average hour spent in processing an order at a node and an hourly rate of labor cost at that node can be gathered from retailers.

In one embodiment, the system further minimizes a fulfillment cost of a current order, wherein the fulfillment cost comprises a plurality of costs incurred by fulfilling the current order. In another embodiment, the fulfillment cost of the order comprising cancelation costs of one or more nodes selected from the plurality of nodes, shipping costs from the selected nodes and fulfillment capacity utilization costs of the selected nodes. Fulfillment capacity utilization cost is determined from capacity utilization, which can be either percentage of total daily capacity used so far, or percentage of ideal capacity at the current time. The percentage of total daily capacity used so far equals the number of items assigned for processing so far in a day divided by proportion of daily capacity.

In one embodiment, the system further comprises applying customer business objective weighting to minimize the fulfillment cost of a current order. Customer business objective weighting is when customers adjust the weighting of the components, including cancelation costs, shipping costs and fulfillment capacity utilization costs, to reflect the importance of the business objectives to them.

In another embodiment, the system further identifies one or more nodes from the plurality of nodes with a lowest fulfillment cost and generates the node order assignment to the one or more nodes with the lowest fulfillment cost. The system applies order splitting to the node order assignment allowing more than one node to be assigned for an order fulfillment.

Figure 2:
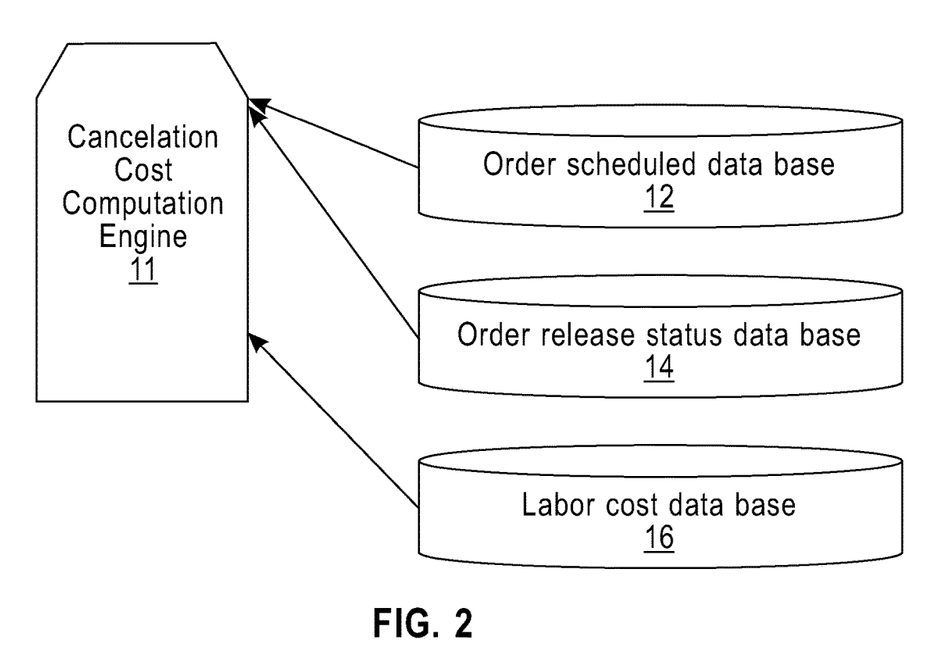
FIG. 2 is a block diagram of the system of the invention.

As is shown in FIG. 2, the diagram depicts one embodiment of the cancelation cost computation engine 11. The cancelation cost computation engine 11 considers a number of orders scheduled from an order scheduled database 12, a number of orders canceled from an order release status database 14, an hourly rate of labor cost and an average hour spent in processing an order from a labor cost database 16 for calculating the cancelation ratio and cancelation cost based on the cancelation ratio.

Figure 3:
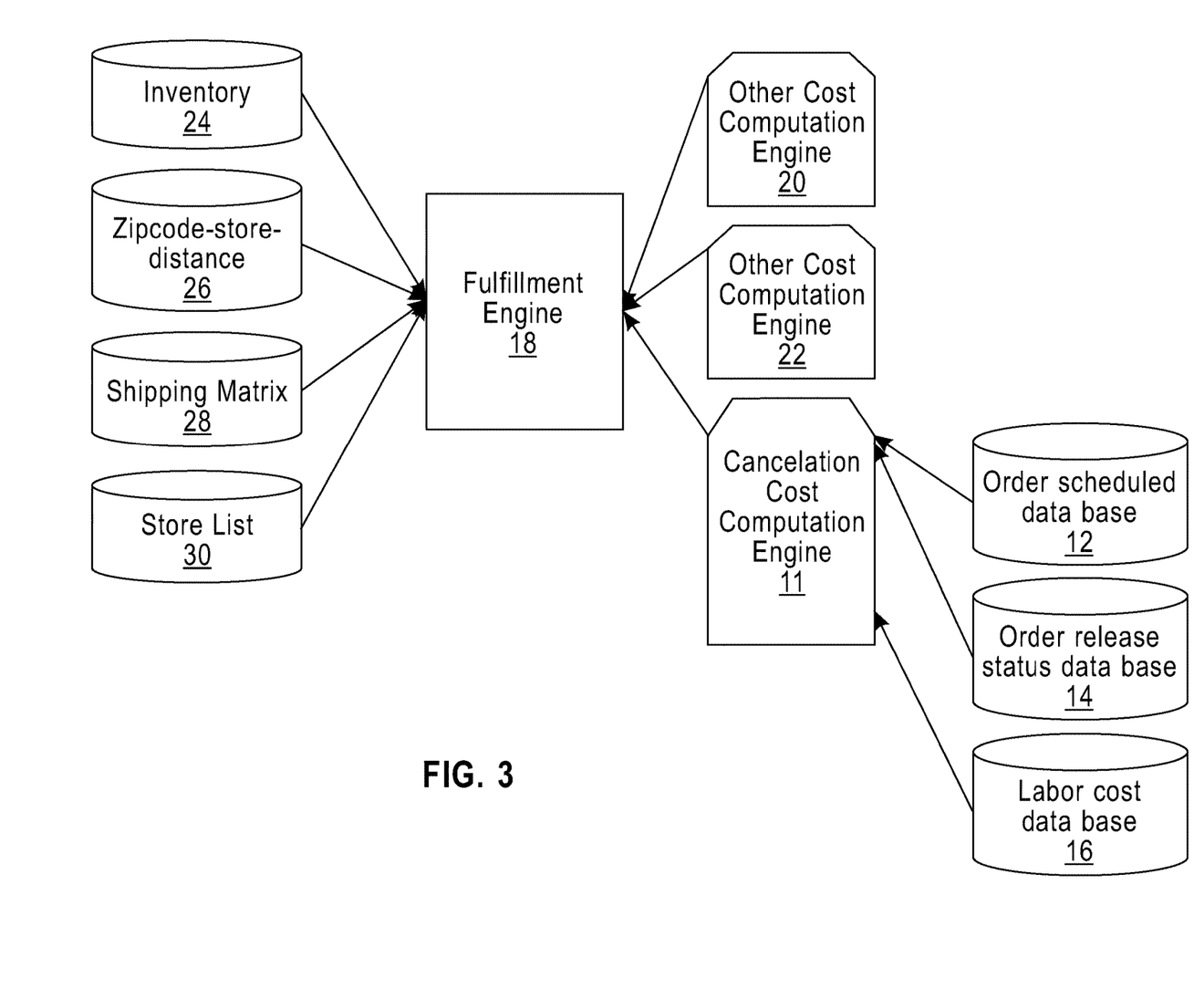
FIG. 3 is a block diagram of one embodiment of the integration between the system of the invention with a fulfillment engine and other cost computation engines.

As is shown in FIG. 3, the diagram depicts one embodiment of the integration between the cancelation cost computation engine 11 with a fulfillment engine 18. Other cost computation engine 20 and other cost computation engine 22. One example of the other cost computation engine 20 is a fulfillment capacity utilization load balancing cost computation engine, which takes a variety of data into consideration. The data includes planned daily capacity, node unit assignment, backlog data, overtime, idling, backlog costs and capacity utilization target range. One example of the other cost computation engine 22 is a loyalty reward module, which takes a variety of data into consideration. The data includes customer loyalty reward data and carrier and shipping method specific $CO_2$/miles data. The data considered by other cost computation engine 20 and other cost computation engine 22 can be overlapping. The fulfillment engine 18 minimizes a fulfillment cost of an order applying customer business objective weighting to costs calculated from cancelation cost computation engine 11, other cost computation engine 20, other cost computation engine 22, and shipping matrix 28. The fulfillment engine 18 obtains inventory data 24, zipcode-store-distance data 26 and store lists 30 for calculating a fulfillment cost and identifying one or more nodes for order fulfillment performance. The system can be implemented as a cloud system or an on-premise system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
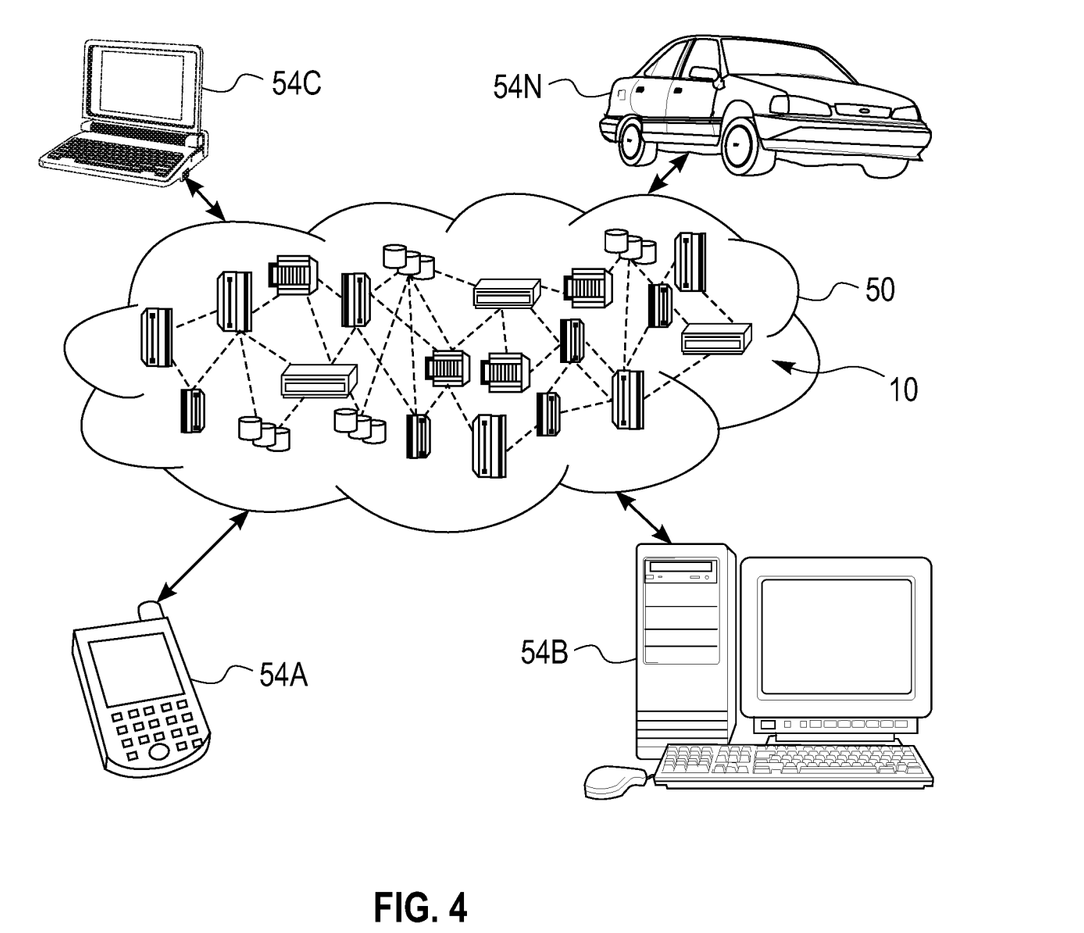
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
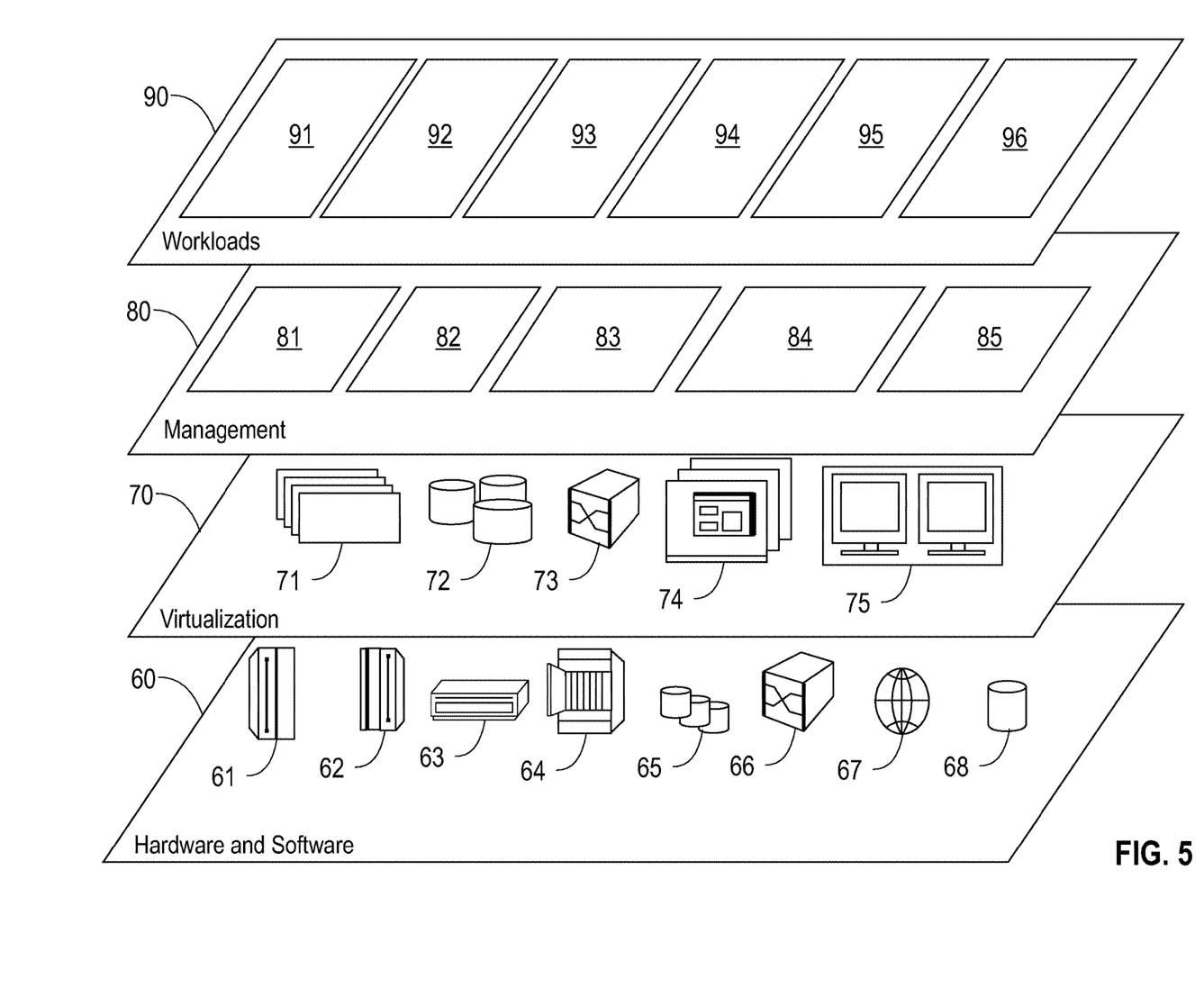
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 6:
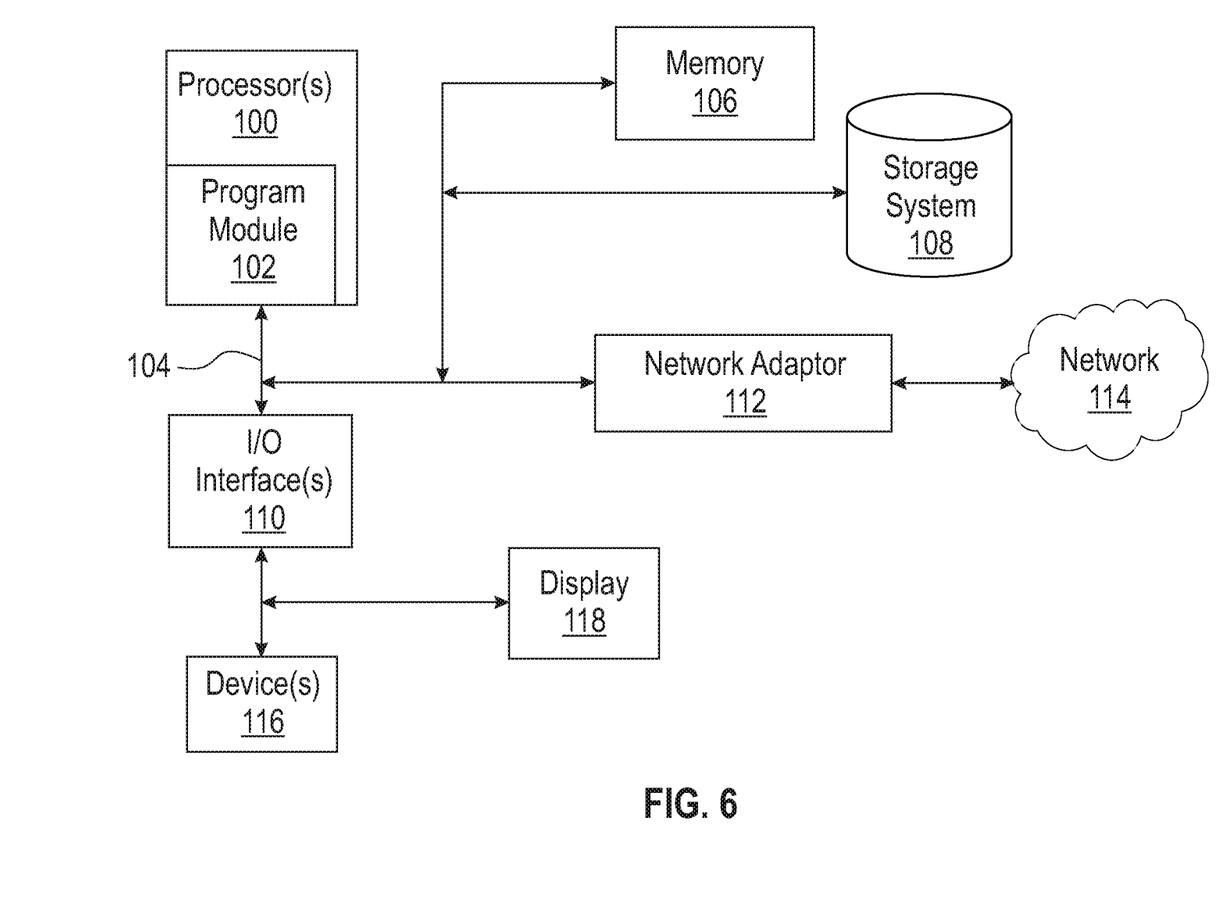
FIG. 6 is a block diagram of an exemplary computing system suitable for implementation of this invention.

FIG. 6 illustrates a schematic of an example computer or processing system that may implement the method for generating node order fulfillment performance. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for determining node order fulfillment, comprising:

receiving, at a cancelation cost computation engine, a current order for fulfillment node assignment, the cancelation cost computation engine comprising one or more non-transitory storage media, and program instructions, stored on the one or more non-transitory computer-readable storage media, which when implemented by a user interface accessing a service provider website, cause the cancelation cost computation engine to perform;

receiving past orders canceled due to back order from an order release database, the past orders canceled due to back order being periodically updated from retail data of each node;

receiving past orders scheduled from an order scheduled database, the past orders scheduled being periodically updated from retail data of each node;

calculating a cancelation ratio of each node of a plurality of nodes by dividing the past orders canceled due to back order from each respective node by the past orders scheduled from the respective node collected from a pre-assigned time period, the pre-assigned time period being dynamically adjusted based on peak and non-peak periods;

determining a cancelation cost of each node by multiplying the cancelation ratio of the node, an average hour spent in processing an order at the node and an hourly rate of labor cost at the node, the average hour spent in processing an order and the hourly rate of labor cost being received by the cancelation cost computation engine from a labor cost database; and transmitting the cancelation cost of each node to an order fulfillment engine, the order fulfillment engine being a multi-objective optimization-based engine of an order management system;

determining by a computer processor of a fulfillment capacity utilization load balancing computation engine, a fulfillment capacity utilization cost of the at least two selected nodes, the fulfillment capacity utilization cost being based on data selected from the group consisting of planned daily planned capacity, backlog data and backlog costs and transmitting the capacity utilization cost of each node to the order fulfillment engine, determining, by a computer processor of the fulfillment engine, a fulfillment cost of the current order for at least two nodes selected from the plurality of nodes, the fulfillment cost of the current order for the at least two selected nodes comprising the cancelation costs of the at least two selected nodes, shipping costs of the at least two selected nodes and the fulfillment capacity utilization costs of the at least two selected nodes; and automatically generating, by the fulfillment engine, a node order assignment for order fulfillment performance to at least one of the at least two selected nodes based on the determined fulfillment cost of the current order for the at least two selected nodes.

2. The computer implemented method of claim 1, wherein the fulfillment cost of the current order further comprises loyalty reward costs of the selected nodes.

3. The computer implemented method of claim 1, further comprising applying customer business objective weighting to the fulfillment cost of the current order.

4. The computer implemented method of claim 3, further comprising generating the node order assignment to the at least one of the at least two selected nodes with the lowest fulfillment cost minimized by the customer business objective weighting.

5. A computer system for determining node order fulfillment, comprising:

a memory; and a processor configured to:

receiving, at a cancelation cost computation engine, a current order for fulfillment node assignment, the cancelation cost computation engine comprising one or more non-transitory storage media, and program instructions, stored on the one or more non-transitory computer-readable storage media, which when implemented by a user interface accessing a service provider website, cause the cancelation cost computation engine to perform;

receiving past orders canceled due to back order from an order release database, the past orders canceled due to back order being periodically updated from retail data of each node;

receiving past orders scheduled from an order scheduled database, the past orders scheduled being periodically updated from retail data of each node;

calculating, a cancelation ratio of each node of a plurality of nodes by dividing the past orders canceled due to back order from each respective node by the past orders scheduled from the respective node collected from a pre-assigned time period, the pre-assigned time period being dynamically adjusted based on peak and non-peak periods;

determining a cancelation cost of each node by multiplying the cancelation ratio of the node, an average hour spent in processing an order at the node and an hourly rate of labor cost at the node, the average hour spent in processing an order and the hourly rate of labor cost being received by the cancelation cost computation engine from a labor cost database; and transmitting the cancelation cost of each node to an order fulfillment engine, the order fulfillment engine being a multi-objective optimization-based engine of an order management system;

determining by a computer processor of a fulfillment capacity utilization load balancing computation engine, a fulfillment capacity utilization cost of the at least two selected nodes, the fulfillment capacity utilization cost being based on data selected form the group consisting of planned daily planned capacity, backlog data and backlog costs and transmitting the capacity utilization cost of each node to the order fulfillment engine, determining, by a computer processor of the fulfillment engine, a fulfillment cost of the current order for at least two nodes selected from the plurality of nodes, the fulfillment cost of the current order for the at least two selected nodes comprising the cancelation costs of the at least two selected nodes, shipping costs of the at least two selected nodes and the fulfillment capacity utilization costs of the at least two selected nodes; and automatically generating, by the fulfillment engine, a node order assignment for order fulfillment performance to at least one of the at least two selected nodes based on the determined fulfillment cost of the current order for the at least two selected nodes.

6. The computer system of claim 5, wherein the fulfillment cost of a current order further comprises loyalty reward costs of the selected nodes.

7. The computer system of claim 5, further comprising applying customer business objective weighting to the fulfillment cost of a current order.

8. The computer system of claim 7, further comprising generating the node order assignment to the at least one of the at least two selected nodes with the lowest fulfillment cost minimized by the customer business objective weighting.

9. A non-transitory article of manufacture tangibly embodying computer readable instructions, which when implemented, cause a computer to perform the steps of a method for determining node order fulfillment, comprising:

receiving, at a cancelation cost computation engine, a current order for fulfillment node assignment, the cancelation cost computation engine comprising one or more non-transitory storage media, and program instructions, stored on the one or more non-transitory computer-readable storage media, which when implemented by a user interface accessing a service provider website, cause the cancelation cost computation engine to perform;

receiving past orders canceled due to back order from an order release database, the past orders canceled due to back order being periodically updated from retail data of each node;

receiving past orders scheduled from an order scheduled database, the past orders scheduled being periodically updated from retail data of each node;

calculating a cancelation ratio of each node of a plurality of nodes by dividing the past orders canceled due to back order from each respective node by the past orders scheduled from the respective node collected from a pre-assigned time period, the pre-assigned time period being dynamically adjusted based on peak and non-peak periods;

determining a cancelation cost of each node by multiplying the cancelation ratio of the node, an average hour spent in processing an order at the node and an hourly rate of labor cost at the node, the average hour spent in processing an order and the hourly rate of labor cost being received by the cancelation cost computation engine from a labor cost database; and transmitting the cancelation cost of each node to an order fulfillment engine, the order fulfillment engine being a multi-objective optimization-based engine of an order management system;

determining by a computer processor of a fulfillment capacity utilization load balancing computation engine, a fulfillment capacity utilization cost of the at least two selected nodes, the fulfillment capacity utilization cost being based on data selected form the group consisting of planned daily planned capacity, backlog data and backlog costs and transmitting the fulfillment capacity utilization cost of each node to the order fulfillment engine;

determining, by a computer processor of the fulfillment engine, a fulfillment cost of the current order for at least two nodes selected from the plurality of nodes, the fulfillment cost of the current order for the at least two selected nodes comprising the cancelation costs of the at least two selected nodes, shipping costs of the at least two selected nodes and the fulfillment capacity utilization costs of the at least two selected nodes; and automatically generating, by the fulfillment engine, a node order assignment for order fulfillment performance to at least one of the at least two selected nodes based on the determined fulfillment cost of the current order for the at least two selected nodes.

10. The non-transitory article of manufacture of claim 9, wherein the fulfillment cost of a current order further comprises loyalty reward costs of the selected nodes.

11. The non-transitory article of manufacture of claim 9, further comprising applying customer business objective weighting to the fulfillment cost of a current order.

12. The non-transitory article of manufacture of claim 11, further comprising generating the node order assignment to the at least one of the at least two selected nodes with the lowest fulfillment cost minimized by the customer business objective weighting.

\* \* \* \* \*